US012681872B2

(12) United States Patent
Yin

(10) Patent No.: US 12,681,872 B2
(45) Date of Patent: Jul. 14, 2026

(54) MEMORY MANAGER, PROCESSOR MEMORY SUBSYSTEM, PROCESSOR, AND ELECTRONIC DEVICE

(71) Applicant: Huawei Technologies Co., Ltd., Shenzhen (CN)

(72) Inventor: Wen Yin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 450 days.

(21) Appl. No.: 17/846,522

(22) Filed: Jun. 22, 2022

(65) Prior Publication Data

US 2022/0327070 A1 Oct. 13, 2022

Related U.S. Application Data

(63) Continuation of application No. PCT/CN2020/131926, filed on Nov. 26, 2020.

(30) Foreign Application Priority Data

| Dec. 23, 2019 | (CN) | ........................ 201911340524.4 |
| Mar. 18, 2020 | (CN) | ........................ 202010192569.8 |

(51) Int. Cl.
| *G06F 12/00* | (2006.01) |
| *G06F 12/0862* | (2016.01) |
| *G06F 13/16* | (2006.01) |
| *G06F 13/38* | (2006.01) |
| *G06F 13/42* | (2006.01) |

(52) U.S. Cl.
CPC ...... *G06F 13/1668* (2013.01); *G06F 12/0862* (2013.01); *G06F 13/387* (2013.01); *G06F 13/4282* (2013.01)

(58) Field of Classification Search
CPC ............. G06F 12/0862; G06F 13/1668; G06F 13/387; G06F 13/4282
See application file for complete search history.

(56) References Cited

U.S. PATENT DOCUMENTS

| 2004/0054852 A1* | 3/2004 | Nain ................... G06F 12/0862 |
| | | 711/167 |
| 2006/0047899 A1* | 3/2006 | Ilda ........................ G06F 3/0619 |
| | | 711/113 |
| 2006/0069932 A1* | 3/2006 | Oshikawa ............. G06F 1/3287 |
| | | 713/300 |
| 2008/0282017 A1 | 11/2008 | Carpenter et al. |
| 2009/0172288 A1* | 7/2009 | Sukegawa ........... G06F 12/0893 |
| | | 711/E12.017 |

(Continued)

FOREIGN PATENT DOCUMENTS

| CN | 1648887 A | 8/2005 |
| CN | 102567256 A | 7/2012 |

(Continued)

*Primary Examiner* — Reginald G Bragdon
*Assistant Examiner* — Michael L Westbrook
(74) *Attorney, Agent, or Firm* — Conley Rose, P.C.

(57) ABSTRACT

A memory manager disposed between a memory and a processor. One end of the memory manager is coupled to the processor using a serial line, and the other end of the memory manager is coupled to the memory using a parallel line to provide the processor with a serial interface instead of a parallel interface.

20 Claims, 6 Drawing Sheets

(56) References Cited

U.S. PATENT DOCUMENTS

| 2010/0235570 A1* | 9/2010 | Tsai | .................... | G06F 12/0862 |
| | | | | 711/E12.001 |
| 2013/0262779 A1* | 10/2013 | Bobba | ................. | G06F 12/0862 |
| | | | | 711/E12.001 |
| 2019/0294548 A1 | 9/2019 | Kraipak et al. | | |
| 2021/0056055 A1* | 2/2021 | Hamilton | ............. | G06F 3/0649 |

FOREIGN PATENT DOCUMENTS

| CN | 105426325 A | 3/2016 |
| CN | 108052478 A | 5/2018 |
| CN | 109669729 A | 4/2019 |

* cited by examiner

MEMORY MANAGER, PROCESSOR MEMORY SUBSYSTEM, PROCESSOR, AND ELECTRONIC DEVICE

CROSS-REFERENCE TO RELATED APPLICATIONS

This is a continuation of International Patent Application No. PCT/CN2020/131926 filed on Nov. 26, 2020, which claims priority to Chinese Patent Application No. 201911340524.4 filed on Dec. 23, 2019 and Chinese Patent Application No. 202010192569.8 filed on Mar. 18, 2020. All of the aforementioned patent applications are hereby incorporated by reference in their entireties.

TECHNICAL FIELD

This disclosure relates to the field of computing technologies, and in particular, to a memory manager, a processor memory subsystem, a processor, and an electronic device.

BACKGROUND

A processor needs to exchange data with a memory in an operation process, for example, read data from the memory or write data into the memory. With development of the processor, a computing capability of the processor is increasingly strong. Therefore, a requirement for a memory bandwidth is also increasingly high. The memory bandwidth is used to measure a rate of data exchange between the processor and the memory. Memory bandwidth=(transmission rate x bus bit width x working frequency)/8, where the bus bit width indicates a quantity of bits of a memory data bus, and represents a maximum amount of data that can be transmitted at a time. The working frequency is a clock frequency of the memory. The transmission rate indicates a quantity of times that each memory data line transmits data in one clock pulse cycle. The working frequency and the transmission rate jointly represent a data transmission frequency.

In a related technology, data is transmitted between the processor and the memory through a parallel bus. Because parallel transmission requires a large quantity of parallel interfaces, and an area of the processor is small, a spacing between the parallel interfaces on the processor is small. Consequently, crosstalk between the parallel interfaces on the processor is serious. To reduce the crosstalk, a working frequency of the parallel interface needs to be reduced. The working frequency of the parallel interface is severely limited.

Consequently, because the working frequency of the parallel interface is low, as the computing capability of the processor gradually increases, the memory bandwidth in a parallel transmission manner cannot meet the bandwidth requirement of the processor, and memory performance limits performance of the processor. This is usually referred to as a "memory wall". Therefore, it is very important to improve the memory bandwidth.

SUMMARY

Embodiments of this disclosure provide a memory manager, a processor memory subsystem, a processor, and an electronic device, to resolve a technical problem in a related technology. Technical solutions are as follows.

According to a first aspect, a memory manager is provided, where the memory manager includes a serial-toparallel conversion interface circuit, a memory control circuit, and a parallel interface circuit. The serial-to-parallel conversion interface circuit includes a serial end and a parallel end, the serial end is configured to connect to a processor, and the parallel end is connected to a first end of the memory control circuit and an internal connection end of the parallel interface circuit. A second end of the memory control circuit is connected to the internal connection end of the parallel interface circuit. An external connection end of the parallel interface circuit is configured to connect to a memory, and the memory control circuit is configured to control data exchange between the processor and the memory.

The memory manager provided in embodiments of this disclosure may be connected to the memory and the processor. Further, the serial-to-parallel conversion interface circuit of the memory manager is connected to the processor, and the parallel interface circuit is connected to the memory.

The processor may be a central processing unit (CPU), a graphics processing unit (GPU), an application-specific integrated circuit (ASIC), or the like. The processor includes a processor die and an input/output (IO) die. A quantity of processor dies included in the processor is not limited in this disclosure. The IO die may also be referred to as an input/output interface circuit. The IO die may be connected to an external device, to implement data transmission between the external device and the processor. The external device may be a disk, a mouse, a keyboard, a printer, or the like. A user may deliver a command to the processor by using the external device and the IO die. The processor may further be connected to an IO die of another processor by using the IO die, so that the two processors form a 2-socket processor.

The memory manager provided in embodiments of this disclosure may be integrated into the processor, or may be made into a separate physical entity that is independent of the processor and the memory. This is not limited in this disclosure.

The processor die includes a processor core and a processor serial-to-parallel conversion interface circuit. The processor serial-to-parallel conversion interface circuit is configured to perform serial-to-parallel conversion on data. Further, the processor serial-to-parallel conversion interface circuit converts data sent to the memory manager into serialized data, and converts serialized data received from the memory manager into parallelized data that is readable for the processor.

The memory may be a synchronous dynamic random-access memory (RAM) (SDRAM), a double data rate (DDR) synchronous dynamic RAM (SDRAM), and the like.

The memory manager includes the serial-to-parallel conversion interface circuit, the memory control circuit, and the parallel interface circuit. The serial-to-parallel conversion interface circuit may be connected to the parallel interface circuit by using a data line. The serial-to-parallel conversion interface circuit may be connected to the memory control circuit by using a control line, and the memory control circuit may be connected to the parallel interface circuit by using a control line. The data line is configured to transmit data such as data read by the processor from the memory, and the control line is configured to transmit control instructions such as a read request and a write request.

The serial-to-parallel conversion interface circuit of the memory manager is configured to perform serial-to-parallel conversion on data. Further, the serial-to-parallel conversion interface circuit may be configured to convert serialized data sent by the processor into parallelized data, convert parallelized data received from the memory into serialized data, and send the serialized data to the processor. The serial-to-parallel conversion interface circuit may also be referred to as a serializer-deserializer, for example, may be a high speed serializer-deserializer (HSS). The HSS may include an HSS physical interface (PHY) and HSS link transfer layer logic. The input/output interface circuit is integrated into the HSS physical interface, and is configured to connect to the processor and perform serial-to-parallel conversion processing on received data. The HSS link transfer layer logic is used to encode, decode, and check data, and may also be referred to as a codec circuit. It should be additionally noted that the serial-to-parallel conversion interface circuit of the processor may also be an HSS.

The memory control circuit is configured to control data exchange between the processor and the memory, process data according to a specified protocol corresponding to the memory (for example, if the memory is a fourth generation DDR memory, the memory controller processes data according to a specified protocol corresponding to the fourth generation DDR memory), and send processed data to the memory. Further, the memory control circuit may determine a time sequence of data sent to the memory, perform addressing in the memory, and the like. A function of the memory control circuit provided in this disclosure may be similar to that of a memory controller in the conventional technology. Details are not described herein.

The external connection end of the parallel interface circuit may be connected to the memory, to implement a connection between the memory manager and the memory.

In the solution shown in this embodiment of this disclosure, this embodiment of this disclosure provides the memory manager. The memory manager may be disposed between the memory and the processor. One end of the memory manager is connected to the processor by using a serial line, and the other end of the memory manager is connected to the memory by using a parallel line. In this way, the processor does not need to be connected to the memory through a parallel interface. Instead, the processor is connected to the memory manager through a serial interface (a serial-to-parallel conversion interface circuit of the processor), and then transmits data to the memory through a parallel interface (a parallel interface circuit) between the memory manager and the memory. Because crosstalk in a serial transmission manner is low, a working frequency corresponding to the serial interface may be set to a higher value. Therefore, although a bus bit width of a group of serial interfaces is less than a bus bit width of a group of parallel interfaces, because the working frequency of the serial interface is higher than a working frequency of the parallel interface, and an increased memory bandwidth brought by an increase in the working frequency is greater than a decreased memory bandwidth caused by a decrease in the bus bit width, a memory bandwidth can be effectively improved according to this disclosure.

In addition, a quantity of serial interfaces in each group is less than a quantity of parallel interfaces in each group, and crosstalk of serial transmission is low. Therefore, a spacing between the serial interfaces may be set to be relatively small, so that more groups of serial interfaces may be disposed on a processor with a small area. In this way, the processor is connected to more memory managers and memories. The processor may transmit data with more memories in parallel. This also improves the memory bandwidth. In addition, more memories mean a larger memory capacity.

In addition, a decrease in the quantity of interfaces of the processor lowers a requirement on a manufacturing process of the processor.

In a possible implementation, the memory manager further includes a cache prefetching circuit, where the cache prefetching circuit is connected to the parallel end of the serial-to-parallel conversion interface circuit and the internal connection end of the parallel interface circuit, and is configured to prefetch data from the memory and store the data.

Both a control line and a data line may be provided between the serial-to-parallel conversion interface circuit and the cache prefetching circuit.

In the solution shown in this embodiment of this disclosure, the serial-to-parallel conversion interface circuit is disposed in the memory manager. Therefore, compared with that in the solution in a related technology, serial-to-parallel conversion of data needs to be performed when data exchange is performed between the memory and the processor. This inevitably increases a memory delay. To offset at least the memory delay, the cache prefetching circuit is further disposed in the memory manager shown in this embodiment of this disclosure. The cache prefetching circuit is configured to prefetch data from the memory by using the parallel interface circuit and store the data. Further, the cache prefetching circuit predicts, by using a prefetch algorithm, data that needs to be read by the processor in a next cycle or next several cycles, prefetches the data from the memory, and stores the data. The prefetch algorithm may be a constant prefetch algorithm, a sequential prefetch algorithm, a prefetch algorithm based on application implication, a prefetch algorithm based on data mining, or the like.

When the processor reads data, the processor may first read data from the cache prefetching circuit, and then read data from the memory when failing to read required data from the cache prefetching circuit. When accuracy of the prefetch algorithm is high, there is a high probability that the processor can read the data from the cache prefetching circuit, so that at least a memory delay caused by the serial-to-parallel conversion interface circuit can be offset.

The cache prefetching circuit may include a cache module and a prefetch module. The cache module is configured to store intermediate data between the processor and the memory. The prefetch module is configured to prefetch, from the memory, data that needs to be read, and store the data in the cache module. The prefetch module and the cache module may be manufactured as one entity circuit.

In a possible implementation, the cache prefetching circuit is further connected to the memory control circuit, and the memory control circuit is configured to control on and off of the cache prefetching circuit.

The memory control circuit and the cache prefetching circuit may be connected by using a control line.

In the solution shown in this embodiment of this disclosure, the memory control circuit may control on and off of the cache prefetching circuit. When the cache prefetching circuit is off, the parallel interface circuit is directly connected to the serial-to-parallel conversion interface circuit. When the cache prefetching circuit is on, the cache prefetching circuit has a normal cache prefetching function.

The memory control circuit is connected to the cache prefetching circuit, so that the cache prefetching circuit can be turned off when the cache prefetching circuit is not needed. For example, when the processor performs processing of an application, if the cache prefetching circuit always has a prefetch error, the cache prefetching circuit may be turned off to save resources.

In a possible implementation, the serial-to-parallel conversion interface circuit is configured to receive a serialized cache data read request sent by the processor, convert the serialized cache data read request into a parallelized cache data read request, and send the parallelized cache data read request to the cache prefetching circuit. The cache prefetching circuit is configured to send parallelized first data corresponding to the cache data read request to the serial-to-parallel conversion interface circuit. The serial-to-parallel conversion interface circuit is further configured to convert the parallelized first data into serialized first data, and send the serialized first data to the processor.

The cache data read request is a read request for data in the cache prefetching circuit.

In the solution shown in this embodiment of this disclosure, the processor sends the cache data read request to the cache prefetching circuit, to directly read the data in the cache prefetching circuit.

The serial-to-parallel conversion interface circuit performs serial-to-parallel conversion on the received serialized cache data read request to convert the serialized cache data read request into the parallelized cache data read request, and sends the parallelized cache data read request to the cache prefetching circuit.

The cache prefetching circuit determines, based on the received cache data read request, the parallelized first data corresponding to the cache data read request, and sends the parallelized first data to the serial-to-parallel conversion interface circuit.

The serial-to-parallel conversion interface circuit performs serial-to-parallel conversion on the received parallelized first data to convert the parallelized first data into the serialized first data, and sends the serialized first data to the processor.

After receiving the serialized first data, the processor converts the serialized first data into the parallelized first data by using the processor serial-to-parallel conversion interface circuit, that is, completes reading the data in the cache prefetching circuit.

In a possible implementation, the serial-to-parallel conversion interface circuit is configured to receive a serialized memory data read request sent by the processor, convert the serialized memory data read request into a parallelized memory data read request, and send the parallelized memory data read request to the memory control circuit. The memory control circuit is configured to send the parallelized memory data read request to the memory by using the parallel interface circuit. The cache prefetching circuit is configured to receive parallelized second data that is sent by the memory and that corresponds to the memory read request, and send the parallelized second data to the serial-to-parallel conversion interface circuit. The serial-to-parallel conversion interface circuit is further configured to convert the parallelized second data into serialized second data, and send the serialized second data to the processor.

The memory data read request is a read request for data in the memory.

In the solution shown in this embodiment of this disclosure, when failing to read required data from the cache prefetching circuit, the processor may read data from the memory, and may send the serialized memory data read request to the memory manager.

The serial-to-parallel conversion interface circuit performs serial-to-parallel conversion on the received serialized memory data read request to convert the serialized memory data read request into the parallelized memory data read request, and sends the parallelized memory data read request to the memory control circuit.

After processing the received parallelized memory data read request according to a related processing protocol, the memory control circuit sends a processed parallelized memory data read request to the memory by using the parallel interface circuit.

The memory determines, based on the received memory data read request, the second data corresponding to the memory data read request, and sends the parallelized second data to the cache prefetching circuit.

The cache prefetching circuit sends the parallelized second data to the serial-to-parallel conversion interface circuit. In this case, the cache prefetching circuit functions as a direct connection channel.

The serial-to-parallel conversion interface circuit performs serial-to-parallel conversion on the parallelized second data to convert the parallelized second data into the serialized second data, and sends the serialized second data to the processor.

After receiving the serialized second data, the processor converts the serialized second data into the parallelized second data by using the processor serial-to-parallel conversion interface circuit, that is, completes reading the data in the memory.

In a possible implementation, the cache prefetching circuit is further configured to store the parallelized second data when receiving the parallelized second data that is sent by the memory and that corresponds to the memory data read request.

In the solution shown in this embodiment of this disclosure, there is a high probability that the processor reads the data in the memory again after reading the data. Therefore, when the cache prefetching circuit receives the second data that is sent by the memory and that corresponds to the memory data read request, the cache prefetching circuit may store the second data, so that the processor can directly read the data from the cache prefetching circuit again. This reduces the memory delay. This may also be understood as a specific example of the prefetch algorithm of the cache prefetching circuit.

In a possible implementation, the serial-to-parallel conversion interface circuit is configured to receive a serialized memory data write request sent by the processor, convert the serialized memory data write request into a parallelized memory data write request, and send the parallelized memory data write request to the memory control circuit. The memory control circuit is configured to send the parallelized memory data write request to the memory by using the parallel interface circuit.

The memory data write request is a write request for data in the memory.

In the solution shown in this embodiment of this disclosure, when the processor needs to perform a write operation on the data in the memory, the processor may send the serialized memory data write request to the memory manager.

The serial-to-parallel conversion interface circuit performs serial-to-parallel conversion on the received serialized memory data write request to convert the serialized memory data write request into the parallelized memory data write request, and sends the parallelized memory data write request to the memory control circuit.

After processing the parallelized memory data write request according to the related processing protocol, the memory control circuit sends a processed parallelized memory data write request to the memory by using the parallel interface circuit.

After receiving the memory data write request, the memory may perform the write operation corresponding to the memory data write request.

In a possible implementation, the cache prefetching circuit is further configured to prefetch, from the memory, processed data obtained through the write operation corresponding to the memory data write request, and store the data.

In the solution shown in this embodiment of this disclosure, after performing the write operation on the data in the memory, there is a high probability that the processor immediately reads the processed data obtained through the write operation. Therefore, after the write operation in the memory is completed, the cache prefetching circuit may further obtain, from the memory, the processed data obtained through the write operation corresponding to the memory data write request, so that the processor may directly read, from the cache prefetching circuit, the data processed through the write operation. This reduces the memory delay. This may also be understood as a specific example of the prefetch algorithm of the cache prefetching circuit.

According to a second aspect, a processor memory subsystem is provided, where the processor memory subsystem includes a processor, a memory, and the memory manager according to any one of the possible implementations of the first aspect. The processor includes a processor serial-to-parallel conversion interface circuit. A serial end of the processor serial-to-parallel conversion interface circuit is connected to a serial end of a serial-to-parallel conversion interface circuit in the memory manager, and an external connection end of a parallel interface circuit of the memory manager is connected to the memory.

The memory manager may be integrated into the processor, or may be independent of the processor and the memory. This is not limited in this disclosure.

The processor may be connected to one memory manager, or may be connected to a plurality of memory managers. This is not limited in this disclosure. Further, a quantity of memory managers and a quantity of memories may be determined based on a quantity of processor dies included in the processor and a quantity of processor cores included in each processor die.

In the solution shown in this embodiment of this disclosure, the processor memory subsystem may include a single processor. For specific content of data exchange between the processor, the memory manager, and the memory, refer to the content in the first aspect.

In a possible implementation, the processor memory subsystem includes two processors, a plurality of memories, and a plurality of memory managers. The two processors are connected to each other by using an input/output interface circuit, each processor is connected to one or more memory managers, and each memory manager is connected to one memory.

In the solution shown in this embodiment of this disclosure, each processor may include two processor dies, each processor die may be connected to two memory managers, and each memory manager may be connected to one memory.

Input/output interface circuits of the two processors are connected. The input/output interface circuit may also be referred to as an IO die. Further, the two processors may be connected through a Hydra interface in the IO die, and two Hydra interfaces are connected by using a Hydra cache coherence system (HCCS).

Compared with a processor memory subsystem including a single processor, in a memory subsystem including two processors, one processor may access data in a memory or a memory manager connected to the other processor. The following describes this case.

In a possible implementation, each processor is configured to send a parallelized cache data read request to the other processor by using an input/output interface circuit. The other processor is configured to convert the parallelized cache data read request into a serialized cache data read request by using a processor serial-to-parallel conversion interface circuit in the other processor, and send the serialized cache data read request to a memory manager corresponding to the other processor.

In the solution shown in this embodiment of this disclosure, for ease of description, the two processors are respectively referred to as a first processor and a second processor. When the first processor needs to read data in a cache prefetching circuit in a memory manager connected to the second processor, the first processor sends a cache data read request to the second processor by using an input/output interface circuit. The cache data read request is parallelized data.

The second processor converts the parallelized cache data read request into a serialized cache data read request by using an internal processor serial-to-parallel conversion interface circuit, and sends the serialized cache data read request to the corresponding memory manager.

After receiving the cache data read request, the memory manager sends data that is in the cache prefetching circuit and that corresponds to the cache data read request to the second processor, where the data sent to the second processor is serialized data.

The second processor receives the serialized data, converts the serialized data into parallelized data by using the internal processor serial-to-parallel conversion interface circuit, and sends the parallelized data to the first processor by using the input/output interface circuit.

The first processor reads the parallelized data, that is, completes reading the data in the cache prefetching circuit in the memory manager connected to the second processor.

In a possible implementation, each processor is configured to send a parallelized memory data read request to the other processor by using the input/output interface circuit. The other processor is configured to convert the parallelized memory data read request into a serialized memory data read request by using the processor serial-to-parallel conversion interface circuit in the other processor, and send the serialized memory data read request to the memory manager corresponding to the other processor.

In the solution shown in this embodiment of this disclosure, for ease of description, the two processors are respectively referred to as the first processor and the second processor. When the first processor needs to read data in a memory connected to the second processor, the first processor sends a memory data read request to the second processor by using the input/output interface circuit. The memory data read request is parallelized data.

The second processor converts the parallelized memory data read request into a serialized memory data read request by using the internal processor serial-to-parallel conversion interface circuit, and sends the serialized memory data read request to the corresponding memory manager.

After performing a series of processing on the memory data read request (for specific processing, refer to the related content of the foregoing memory manager), the memory manager sends the memory data read request to the memory.

The memory sends serialized data corresponding to the memory data read request to the second processor by using the memory manager.

The second processor receives the serialized data, converts the serialized data into parallelized data by using the internal processor serial-to-parallel conversion interface circuit, and sends the parallelized data to the first processor by using the input/output interface circuit.

The first processor reads the parallelized data, that is, completes reading the data in the memory connected to the second processor.

In a possible implementation, each processor is configured to send a parallelized memory data write request to the other processor by using the input/output interface circuit. The other processor is configured to convert the parallelized memory data write request into a serialized memory data write request by using the processor serial-to-parallel conversion interface circuit in the other processor, and send the serialized memory data write request to the memory manager corresponding to the other processor.

In the solution shown in this embodiment of this disclosure, for ease of description, the two processors are respectively referred to as the first processor and the second processor. When the first processor needs to perform a write operation on the data in the memory connected to the second processor, the first processor sends a memory data write request to the second processor by using the input/output interface circuit. The memory data write request is parallelized data.

The second processor converts the parallelized memory data write request into a serialized memory data write request by using the internal processor serial-to-parallel conversion interface circuit, and sends the serialized memory data write request to the corresponding memory manager.

After performing a series of processing on the memory data write request (for specific processing, refer to the related content of the foregoing memory manager), the memory manager sends the memory data write request to the memory.

The memory performs the write operation corresponding to the memory data write request. In this way, the first processor completes the write operation on the data in the memory connected to the second processor.

In a possible implementation, each processor is configured to receive serialized data sent by the memory manager, convert the serialized data into parallelized data by using the processor serial-to-parallel conversion interface circuit in the processor, and send the parallelized data to the other processor by using the input/output interface circuit.

In the solution shown in this embodiment of this disclosure, for ease of description, the two processors are respectively referred to as the first processor and the second processor. When the second processor reads the data in the memory manager or the memory connected to the first processor, the first processor receives the serialized data (the serialized data may be read from the cache prefetching circuit, or may be read from the memory) sent by the memory manager, converts the serialized data into the parallelized data by using the processor serial-to-parallel conversion interface circuit, and sends the parallelized data to the second processor by using the input/output interface circuit.

In a possible implementation, the memory manager is integrated into the processor.

In a possible implementation, the memory manager is independent of the processor and the memory.

According to a third aspect, a processor is provided, where the processor is integrated with the memory manager according to any one of the possible implementations of the first aspect.

According to a fourth aspect, an electronic device is provided, where the electronic device includes the processor memory subsystem according to any one of the possible implementations of the second aspect.

The technical solutions provided in embodiments of this disclosure bring the following beneficial effects.

Embodiments of this disclosure provide the memory manager. The memory manager may be disposed between the memory and the processor. One end of the memory manager is connected to the processor by using a serial line, and the other end of the memory manager is connected to the memory by using a parallel line. In this way, the processor may be provided with a serial interface instead of a parallel interface. Because crosstalk in a serial transmission manner is low, a working frequency corresponding to the serial interface may be set to a higher value. Therefore, although a bus bit width of a group of serial interfaces is less than a bus bit width of a group of parallel interfaces, because the working frequency of the serial interface is higher than a working frequency of the parallel interface, and an increased memory bandwidth brought by an increase in the working frequency is greater than a decreased memory bandwidth caused by a decrease in the bus bit width, a memory bandwidth can be effectively improved according to this disclosure.

DESCRIPTION OF EMBODIMENTS

An embodiment of this disclosure provides a memory manager. As shown in FIG. 1 to FIG. 4, the memory manager includes a serial-to-parallel conversion interface circuit, a memory control circuit, and a parallel interface circuit. The serial-to-parallel conversion interface circuit includes a serial end and a parallel end, the serial end is configured to connect to a processor, and the parallel end is connected to a first end of the memory control circuit and an internal connection end of the parallel interface circuit. A second end of the memory control circuit is connected to the internal connection end of the parallel interface circuit. An external connection end of the parallel interface circuit is configured to connect to a memory, and the memory control circuit is configured to control data exchange between the processor and the memory.

The memory manager provided in this embodiment of this disclosure may be connected to the memory and the processor. Further, the serial-to-parallel conversion interface circuit of the memory manager is connected to the processor, and the parallel interface circuit is connected to the memory.

Figure 5:
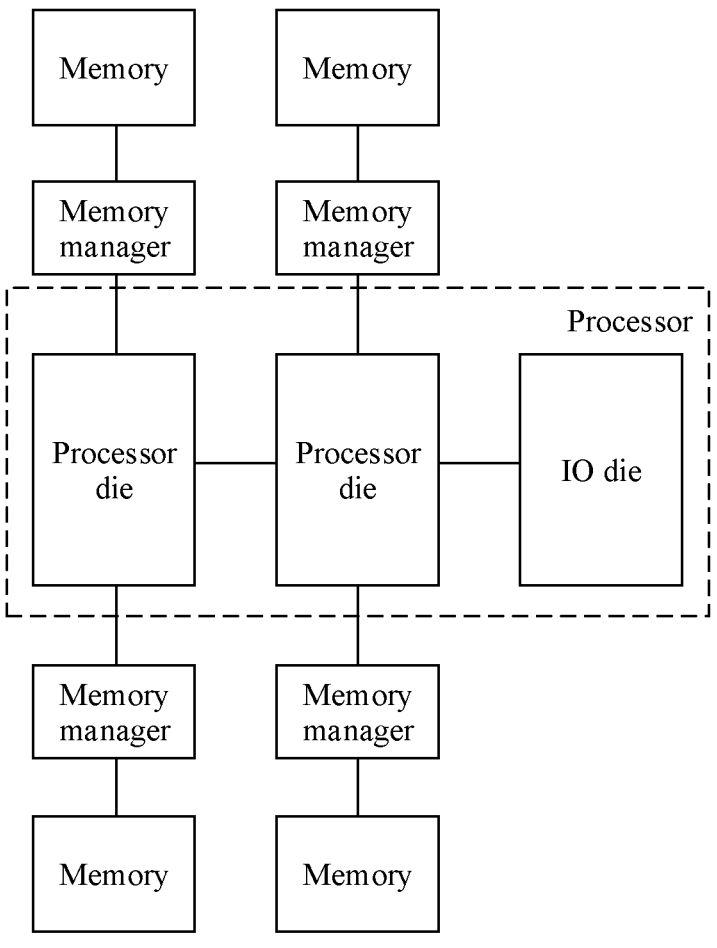
FIG. 5 is a diagram of a logical architecture of a processor memory subsystem according to an embodiment of this disclosure.
Figure 6:
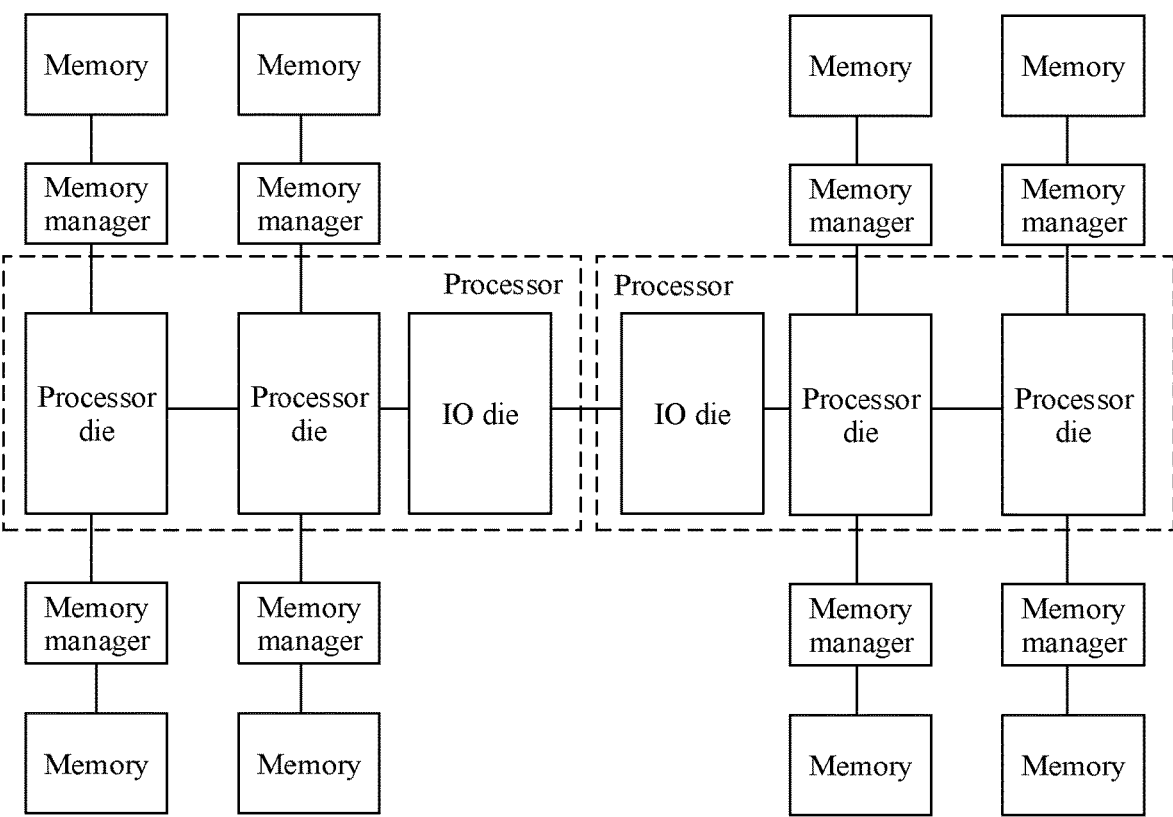
FIG. 6 is a diagram of a logical architecture of a processor memory subsystem according to an embodiment of this disclosure.

The processor may be a CPU, a GPU, an ASIC, or the like. The processor includes a processor die and an IO die. A quantity of processor dies included in the processor is not limited in this disclosure. As shown in FIG. 5 and FIG. 6, the processor may include two processor dies. The IO die may also be referred to as an input/output interface circuit. The IO die may be connected to an external device, to implement data transmission between the external device and the processor. The external device may be a disk, a mouse, a keyboard, a printer, or the like. A user may deliver a command to the processor by using the external device and the input/output interface circuit. The processor may further be connected to an IO die of another processor by using the IO die, so that the two processors form a 2-socket processor.

The memory manager provided in this embodiment of this disclosure may be integrated into the processor, or may be made into a separate physical entity that is independent of the processor and the memory. This is not limited in this disclosure.

Figure 7:
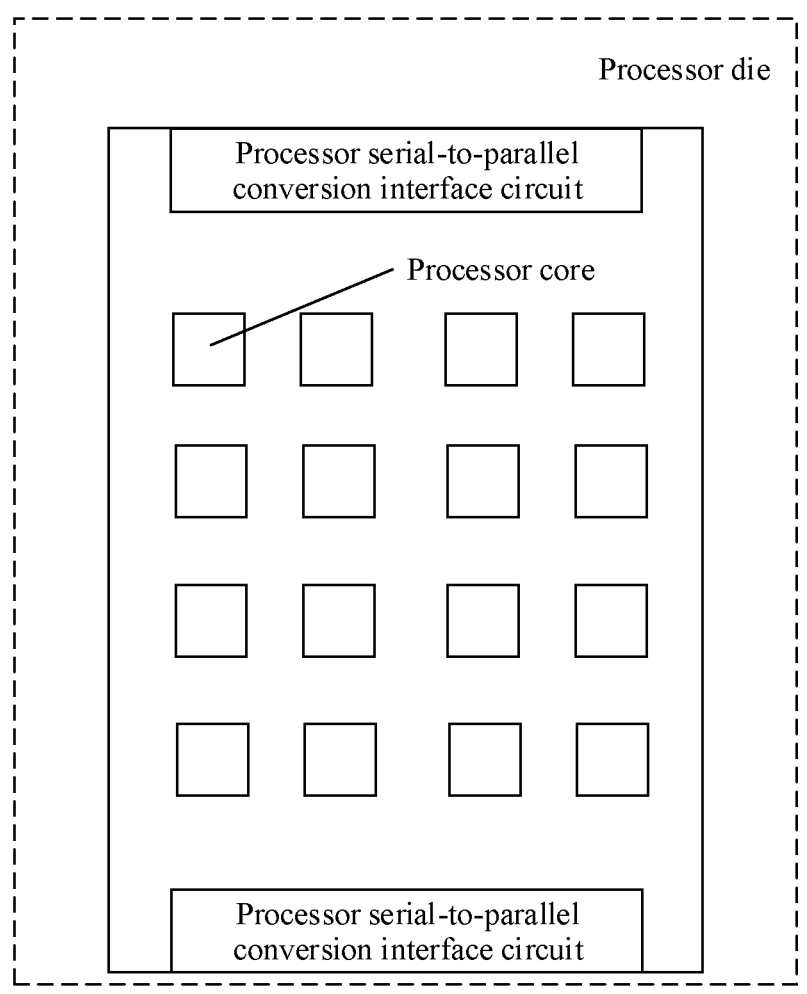
FIG. 7 is a diagram of a logical architecture of a processor die according to an embodiment of this disclosure.

As shown in FIG. 7, the processor die includes a processor core and a processor serial-to-parallel conversion interface circuit. The processor serial-to-parallel conversion interface circuit is configured to perform serial-to-parallel conversion on data. Further, the processor serial-to-parallel conversion interface circuit converts data sent to the memory manager into serialized data, and converts serialized data received from the memory manager into parallelized data that is readable for the processor.

The memory may be an SDRAM, a DDR SDRAM, and the like.

The memory manager includes the serial-to-parallel conversion interface circuit, the memory control circuit, and the parallel interface circuit. The serial-to-parallel conversion interface circuit may be connected to the parallel interface circuit by using a data line. The serial-to-parallel conversion interface circuit may be connected to the memory control circuit by using a control line, and the memory control circuit may be connected to the parallel interface circuit by using a control line. The data line is used to transmit data read by the processor from the memory, and the like. The control line is used to transmit control instructions such as a read request and a write request. As shown in FIG. 1 to FIG. 4, a solid line connection in the figures represents a data line connection, and a dashed line connection represents a control line connection.

The serial-to-parallel conversion interface circuit of the memory manager is configured to perform serial-to-parallel conversion on data. Further, the serial-to-parallel conversion interface circuit may be configured to convert serialized data sent by the processor into parallelized data, convert parallelized data received from the memory into serialized data, and send the serialized data to the processor. The serial-to-parallel conversion interface circuit may also be referred to as a serializer-deserializer, for example, may be a HSS. The HSS may include an HSS PHY and HSS link transfer layer logic. The input/output interface circuit is integrated into the HSS physical interface, and is configured to connect to the processor and perform serial-to-parallel conversion on received data. The HSS link transfer layer logic is used to encode, decode, and check data, and may also be referred to as a codec circuit. It should be additionally noted that the serial-to-parallel conversion interface circuit of the processor may also be an HSS.

The memory control circuit is configured to control data exchange between the processor and the memory, process data according to a specified protocol corresponding to the memory (for example, if the memory is a fourth generation DDR memory, the memory controller processes data according to a specified protocol corresponding to the fourth generation DDR memory), and send processed data to the memory. Further, the memory control circuit may determine a time sequence of data sent to the memory, perform addressing in the memory, and the like. A function of the memory control circuit provided in this disclosure may be similar to that of a memory controller in the conventional technology. Details are not described herein.

The external connection end of the parallel interface circuit may be connected to the memory, to implement a connection between the memory manager and the memory.

Figure 3:
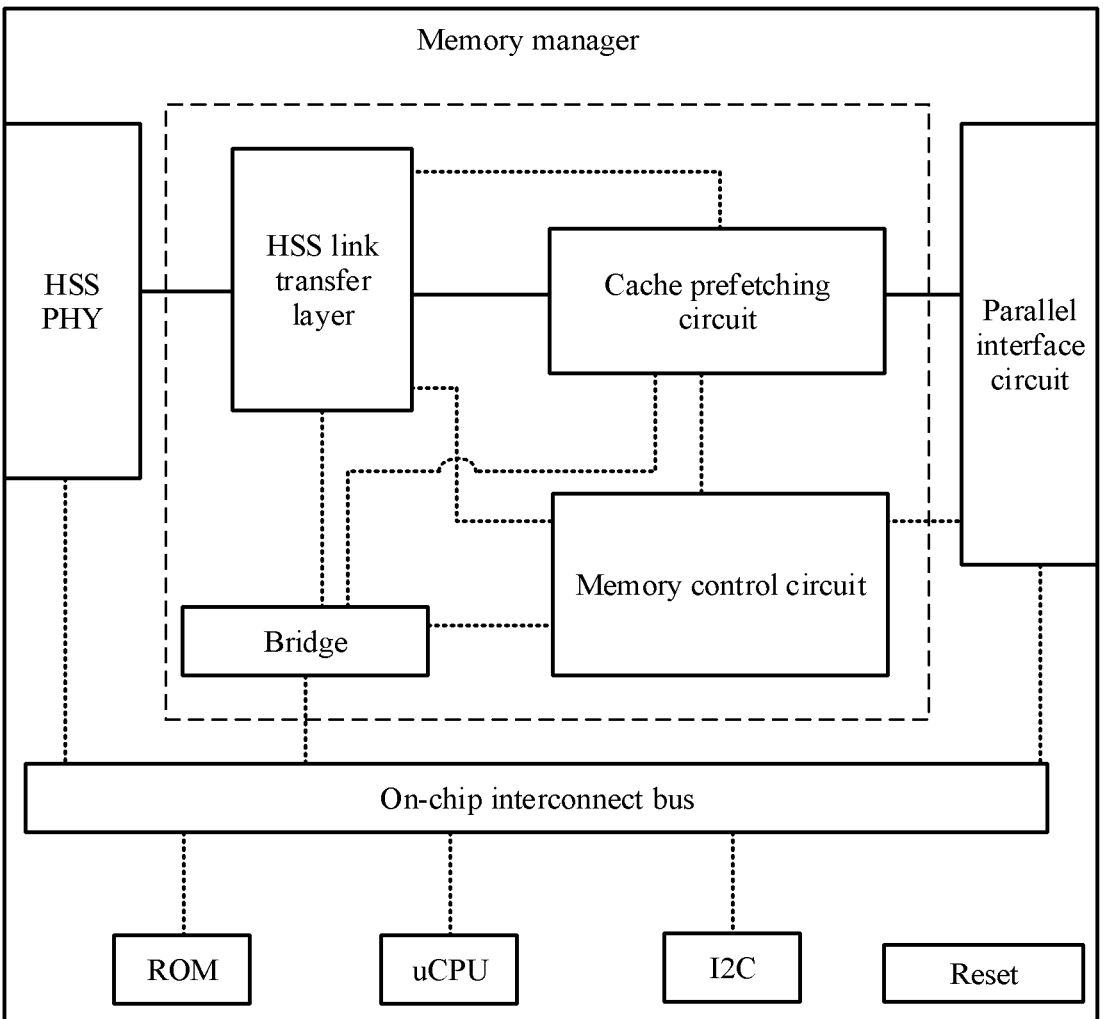
FIG. 3 is a diagram of a logical architecture of a memory manager according to an embodiment of this disclosure.
Figure 4:
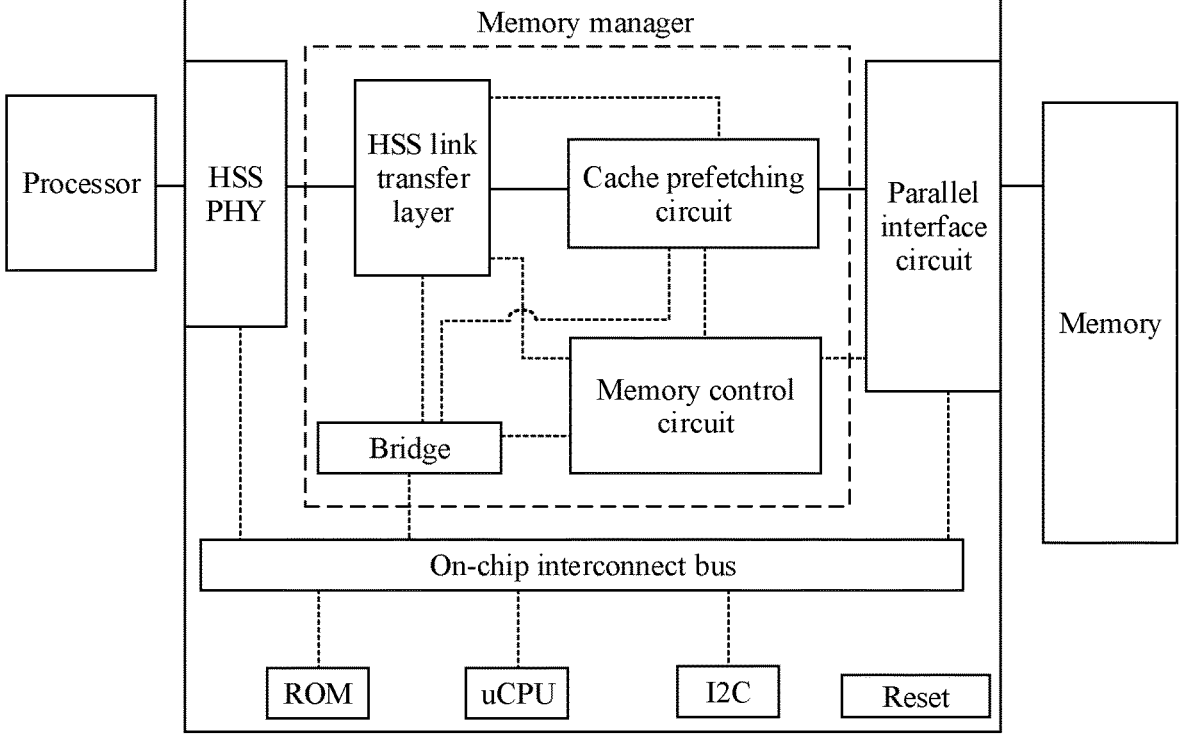
FIG. 4 is a diagram of a logical architecture of a processor memory subsystem according to an embodiment of this disclosure.

It should be additionally noted that the serial-to-parallel conversion interface circuit, the memory control circuit, and the parallel interface circuit may be collectively referred to as data link layer circuits. In addition to the foregoing data link layer circuits, as shown in FIG. 3 and FIG. 4, the memory manager provided in this embodiment of this disclosure may further include control circuits. Further, the control circuits may include the following circuits: a bridge circuit configured to perform bridging processing on data transmission between the data link circuit and the control circuit, an on-chip interconnect bus, which is an interconnect bus inside the memory manager, a microcontroller configured to control and debug the memory manager, a read-only memory (ROM) configured to store code for startup and debugging of the memory manager, a reset controller, which may also be referred to as a reset controller, and is configured to perform reset initialization of the memory manager, and an Inter-Integrated Circuit (I2C) interface, where an I2C is a bidirectional 2-wire synchronous serial bus that transmits information between components connected to the bus.

In the solution shown in this embodiment of this disclosure, this embodiment of this disclosure provides the memory manager. The memory manager may be disposed between the memory and the processor. One end of the memory manager is connected to the processor by using a serial line, and the other end of the memory manager is connected to the memory by using a parallel line. In this way, the processor may be provided with a serial interface (namely, a serial-to-parallel conversion interface circuit of the processor) instead of a parallel interface. Because crosstalk in a serial transmission manner is low, a working frequency corresponding to the serial interface may be set to a higher value. Therefore, although a bus bit width of a group of serial interfaces is less than a bus bit width of a group of parallel interfaces, because the working frequency of the serial interface is higher than a working frequency of the parallel interface, and an increased memory bandwidth brought by an increase in the working frequency is greater than a decreased memory bandwidth caused by a decrease in the bus bit width, a memory bandwidth can be effectively improved according to this disclosure.

In addition, a quantity of serial interfaces in each group is less than a quantity of parallel interfaces in each group, and crosstalk of serial transmission is low. Therefore, a spacing between the serial interfaces may be set to be relatively small, so that more groups of serial interfaces may be disposed on a processor with a small area. In this way, the processor is connected to more memory managers and memories. The processor may transmit data with more memories in parallel. This also improves the memory bandwidth. In addition, more memories mean a larger memory capacity.

In addition, a decrease in the quantity of interfaces of the processor lowers a requirement on a manufacturing process of the processor.

Figure 1:
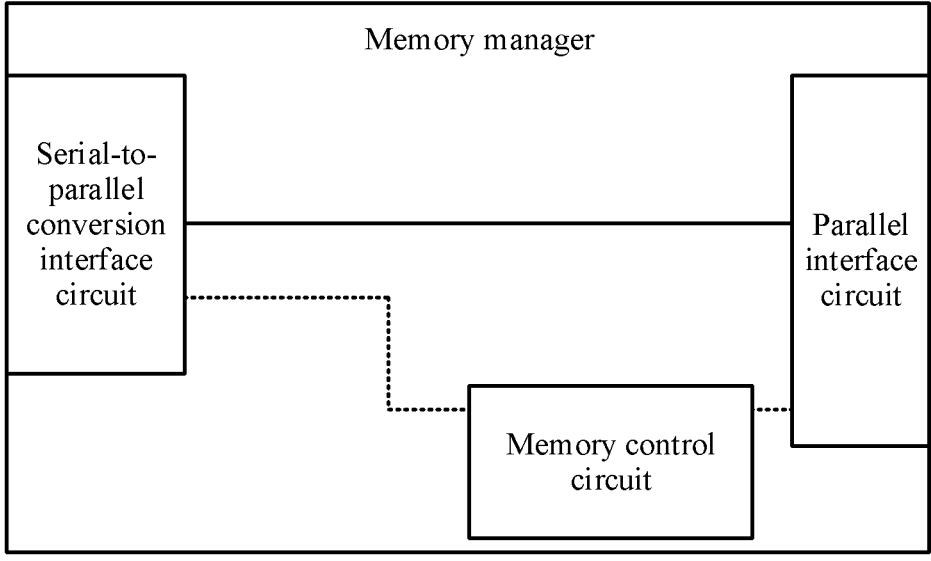
FIG. 1 is a diagram of a logical architecture of a memory manager according to an embodiment of this disclosure.
Figure 2:
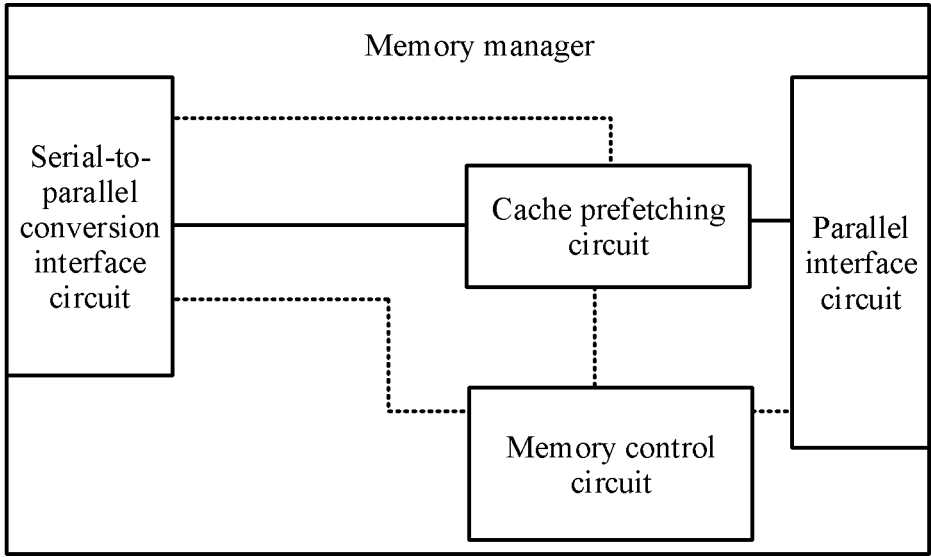
FIG. 2 is a diagram of a logical architecture of a memory manager according to an embodiment of this disclosure.

In a possible implementation, as shown in FIG. 2 to FIG. 4, the memory manager further includes a cache prefetching circuit. The cache prefetching circuit is connected to the parallel end of the serial-to-parallel conversion interface circuit and the internal connection end of the parallel interface circuit. The cache prefetching circuit is configured to prefetch data from the memory and store the data.

Both a control line and a data line may be provided between the serial-to-parallel conversion interface circuit and the cache prefetching circuit.

In the solution shown in this embodiment of this disclosure, the serial-to-parallel conversion interface circuit is disposed in the memory manager. Therefore, compared with that in the solution in a related technology, serial-to-parallel conversion of data needs to be performed when data exchange is performed between the memory and the processor. This inevitably increases a memory delay. To offset at least the memory delay, the cache prefetching circuit is further disposed in the memory manager shown in this embodiment of this disclosure. The cache prefetching circuit is configured to prefetch data from the memory by using the parallel interface circuit and store the data. Further, the cache prefetching circuit predicts, by using a prefetch algorithm, data that needs to be read by the processor in a next cycle or next several cycles, prefetches the data from the memory, and stores the data. The prefetch algorithm may be a constant prefetch algorithm, a sequential prefetch algorithm, a prefetch algorithm based on application implication, a prefetch algorithm based on data mining, or the like.

When the processor reads data, the processor may first read data from the cache prefetching circuit, and then read data from the memory when failing to read required data from the cache prefetching circuit. When accuracy of the prefetch algorithm is high, there is a high probability that the processor can read the data from the cache prefetching circuit, so that at least a memory delay caused by the serial-to-parallel conversion interface circuit can be offset.

The cache prefetching circuit may include a cache module and a prefetch module. The cache module is configured to store intermediate data between the processor and the memory. The prefetch module is configured to prefetch, from the memory, data that needs to be read, and store the data in the cache module. The prefetch module and the cache module may be manufactured as one entity circuit.

In a possible implementation, as shown in FIG. 2 and FIG. 4, the memory control circuit is further connected to the cache prefetching circuit.

The memory control circuit and the cache prefetching circuit may be connected by using a control line.

In the solution shown in this embodiment of this disclosure, the memory control circuit may control on and off of the cache prefetching circuit. When the cache prefetching circuit is off, the parallel interface circuit is directly connected to the serial-to-parallel conversion interface circuit. When the cache prefetching circuit is on, the cache prefetching circuit has a normal cache prefetching function.

The memory control circuit is connected to the cache prefetching circuit, so that the cache prefetching circuit can be turned off when the cache prefetching circuit is not needed. For example, when the processor performs processing of an application, if the cache prefetching circuit always has a prefetch error, the cache prefetching circuit may be turned off to save resources.

In a possible implementation, the serial-to-parallel conversion interface circuit is configured to receive a serialized cache data read request sent by the processor, convert the serialized cache data read request into a parallelized cache data read request, and send the parallelized cache data read request to the cache prefetching circuit. The cache prefetching circuit is configured to send parallelized first data corresponding to the cache data read request to the serial-to-parallel conversion interface circuit. The serial-to-parallel conversion interface circuit is further configured to convert the parallelized first data into serialized first data, and send the serialized first data to the processor.

The cache data read request is a read request for data in the cache prefetching circuit.

In the solution shown in this embodiment of this disclosure, the processor sends the cache data read request to the cache prefetching circuit, to directly read the data in the cache prefetching circuit.

The serial-to-parallel conversion interface circuit performs serial-to-parallel conversion on the received serialized cache data read request to convert the serialized cache data read request into the parallelized cache data read request, and sends the parallelized cache data read request to the cache prefetching circuit.

The cache prefetching circuit determines, based on the received cache data read request, the parallelized first data corresponding to the cache data read request, and sends the parallelized first data to the serial-to-parallel conversion interface circuit.

The serial-to-parallel conversion interface circuit performs serial-to-parallel conversion on the received parallelized first data to convert the parallelized first data into the serialized first data, and sends the serialized first data to the processor.

After receiving the serialized first data, the processor converts the serialized first data into the parallelized first data by using the processor serial-to-parallel conversion interface circuit, that is, completes reading the data in the cache prefetching circuit.

In a possible implementation, the serial-to-parallel conversion interface circuit is configured to receive a serialized memory data read request sent by the processor, convert the serialized memory data read request into a parallelized memory data read request, and send the parallelized memory data read request to the memory control circuit. The memory control circuit is configured to send the parallelized memory data read request to the memory by using the parallel interface circuit. The cache prefetching circuit is configured to receive parallelized second data that is sent by the memory and that corresponds to the memory data read request, and send the parallelized second data to the serial-to-parallel conversion interface circuit. The serial-to-parallel conversion interface circuit is further configured to convert the parallelized second data into serialized second data, and send the serialized second data to the processor.

The memory data read request is a read request for data in the memory.

In the solution shown in this embodiment of this disclosure, when failing to read required data from the cache prefetching circuit, the processor may read data from the memory, and may send the serialized memory data read request to the memory manager.

The serial-to-parallel conversion interface circuit performs serial-to-parallel conversion on the received serialized memory data read request to convert the serialized memory data read request into the parallelized memory data read request, and sends the parallelized memory data read request to the memory control circuit.

After processing the received parallelized memory data read request according to a related processing protocol, the memory control circuit sends a processed parallelized memory data read request to the memory by using the parallel interface circuit.

The memory determines, based on the received memory data read request, the second data corresponding to the memory data read request, and sends the parallelized second data to the cache prefetching circuit.

The cache prefetching circuit sends the parallelized second data to the serial-to-parallel conversion interface circuit. In this case, the cache prefetching circuit functions as a direct connection channel.

The serial-to-parallel conversion interface circuit performs serial-to-parallel conversion on the parallelized second data to convert the parallelized second data into the serialized second data, and sends the serialized second data to the processor.

After receiving the serialized second data, the processor converts the serialized second data into the parallelized second data by using the processor serial-to-parallel conversion interface circuit, that is, completes reading the data in the memory.

In a possible implementation, the cache prefetching circuit is further configured to store the parallelized second data when receiving the parallelized second data that is sent by the memory and that corresponds to the memory data read request.

In the solution shown in this embodiment of this disclosure, there is a high probability that the processor reads the data in the memory again after reading the data. Therefore, when the cache prefetching circuit receives the second data that is sent by the memory and that corresponds to the memory data read request, the cache prefetching circuit may store the second data, so that the processor can directly read the data from the cache prefetching circuit again. This reduces the memory delay. This may also be understood as a specific example of the prefetch algorithm of the cache prefetching circuit.

In a possible implementation, the serial-to-parallel conversion interface circuit is configured to receive a serialized memory data write request sent by the processor, convert the serialized memory data write request into a parallelized memory data write request, and send the parallelized memory data write request to the memory control circuit. The memory control circuit is configured to send the parallelized memory data write request to the memory by using the parallel interface circuit.

The memory data write request is a write request for data in the memory.

In the solution shown in this embodiment of this disclosure, when the processor needs to perform a write operation on the data in the memory, the processor may send the serialized memory data write request to the memory manager.

The serial-to-parallel conversion interface circuit performs serial-to-parallel conversion on the received serialized memory data write request to convert the serialized memory data write request into the parallelized memory data write request, and sends the parallelized memory data write request to the memory control circuit.

After processing the parallelized memory data write request according to the related processing protocol, the memory control circuit sends a processed parallelized memory data write request to the memory by using the parallel interface circuit.

After receiving the memory data write request, the memory may perform the write operation corresponding to the memory data write request.

In a possible implementation, the cache prefetching circuit is further configured to prefetch, from the memory, processed data obtained through the write operation corresponding to the memory data write request, and store the data.

In the solution shown in this embodiment of this disclosure, after performing the write operation on the data in the memory, there is a high probability that the processor immediately reads the processed data obtained through the write operation. Therefore, after the write operation in the memory is completed, the cache prefetching circuit may further obtain, from the memory, the processed data obtained through the write operation corresponding to the memory data write request, so that the processor may directly read, from the cache prefetching circuit, the data processed through the write operation. This reduces the memory delay. This may also be understood as a specific example of the prefetch algorithm of the cache prefetching circuit.

An embodiment of this disclosure further provides a processor memory subsystem. As shown in FIG. 4, FIG. 5, and FIG. 6, the processor memory subsystem includes a processor, a memory, and the foregoing memory manager. The processor includes a processor serial-to-parallel conversion interface circuit, and a serial end of the processor serial-to-parallel conversion interface circuit is connected to a serial end of a serial-to-parallel conversion interface circuit in the memory manager. An external connection end of a parallel interface circuit of the memory manager is connected to the memory.

The memory manager may be integrated into the processor, or may be independent of the processor and the memory. This is not limited in this disclosure.

The processor may be connected to one memory manager, or may be connected to a plurality of memory managers. This is not limited in this disclosure. Further, a quantity of memory managers may be determined based on a quantity of processor dies included in the processor and a quantity of processor cores included in each processor die, to determine a quantity of memories.

In the solution shown in this embodiment of this disclosure, as shown in FIG. 5, the processor memory subsystem may include a single processor. The single processor includes two processor dies, each processor die is connected to two memory managers, and each memory manager is connected to one memory.

For specific content of data exchange between the processor, the memory manager, and the memory, refer to the content of the foregoing memory manager.

It should be additionally noted that, when the processor sends data to the memory manager, an internal processing process of the processor may be described as follows.

The processor performs data operation and processing, and transmits, by using an on-chip cache, data that needs to be sent. The on-chip cache of the processor may be usually layered into a level-1 cache (L1 Cache), a level-2 cache (L2 Cache), and a level-3 cache (L3 Cache).

Consistency processing is performed on data in the on-chip cache by using a lock mechanism, to ensure that each processor core reads data in the memory according to a specific rule, so as to avoid data inconsistency.

In a possible implementation, as shown in FIG. 6, the processor memory subsystem includes two processors, a plurality of memories, and a plurality of memory managers. The two processors are connected to each other by using an input/output interface circuit. Each processor is connected to one or more memory managers, and each memory manager is connected to one memory.

In the solution shown in this embodiment of this disclosure, each processor includes two processor dies, each processor die is connected to two memory managers, and each memory manager is connected to one memory.

Input/output interface circuits of the two processors are connected. The input/output interface circuit may also be referred to as an IO die. Further, the two processors may be connected through a Hydra interface in the IO die, and two Hydra interfaces are connected by using an HCCS.

Compared with a processor memory subsystem including a single processor, in a memory subsystem including two processors, one processor may access data in a memory or a memory manager connected to the other processor. The following describes this case.

In a possible implementation, each processor is configured to send a parallelized cache data read request to the other processor by using an input/output interface circuit. The other processor is configured to convert the parallelized cache data read request into a serialized cache data read request by using an internal processor serial-to-parallel conversion interface circuit, and send the serialized cache data read request to a memory manager corresponding to the other processor.

In the solution shown in this embodiment of this disclosure, for ease of description, the two processors are respectively referred to as a first processor and a second processor. When the first processor needs to read data in a cache prefetching circuit in a memory manager connected to the second processor, the first processor sends a cache data read request to the second processor by using an input/output interface circuit. The cache data read request is parallelized data.

The second processor converts the parallelized cache data read request into a serialized cache data read request by using an internal processor serial-to-parallel conversion interface circuit, and sends the serialized cache data read request to the corresponding memory manager.

After receiving the cache data read request, the memory manager sends data that is in the cache prefetching circuit and that corresponds to the cache data read request to the second processor, where the data sent to the second processor is serialized data.

The second processor receives the serialized data, converts the serialized data into parallelized data by using the internal processor serial-to-parallel conversion interface circuit, and sends the parallelized data to the first processor by using the input/output interface circuit.

The first processor reads the parallelized data, that is, completes reading the data in the cache prefetching circuit in the memory manager connected to the second processor.

In a possible implementation, each processor is configured to send a parallelized memory data read request to the other processor by using the input/output interface circuit. The other processor is configured to convert the parallelized memory data read request into a serialized memory data read request by using the internal processor serial-to-parallel conversion interface circuit, and send the serialized memory data read request to the memory manager corresponding to the other processor.

In the solution shown in this embodiment of this disclosure, for ease of description, the two processors are respectively referred to as the first processor and the second processor. When the first processor needs to read data in a memory connected to the second processor, the first processor sends a memory data read request to the second processor by using the input/output interface circuit. The memory data read request is parallelized data.

The second processor converts the parallelized memory data read request into a serialized memory data read request by using the internal processor serial-to-parallel conversion interface circuit, and sends the serialized memory data read request to the corresponding memory manager.

After performing a series of processing on the memory data read request (for specific processing, refer to the related content of the foregoing memory manager), the memory manager sends the memory data read request to the memory.

The memory sends serialized data corresponding to the memory data read request to the second processor by using the memory manager.

The second processor receives the serialized data, converts the serialized data into parallelized data by using the internal processor serial-to-parallel conversion interface circuit, and sends the parallelized data to the first processor by using the input/output interface circuit.

The first processor reads the parallelized data, that is, completes reading the data in the memory connected to the second processor.

In a possible implementation, each processor is configured to send a parallelized memory data write request to the other processor by using the input/output interface circuit. The other processor is configured to convert the parallelized memory data write request into a serialized memory data write request by using the internal processor serial-to-parallel conversion interface circuit, and send the serialized memory data write request to the memory manager corresponding to the other processor.

In the solution shown in this embodiment of this disclosure, for ease of description, the two processors are respectively referred to as the first processor and the second processor. When the first processor needs to perform a write operation on the data in the memory connected to the second processor, the first processor sends a memory data write request to the second processor by using the input/output interface circuit. The memory data write request is parallelized data.

The second processor converts the parallelized memory data write request into a serialized memory data write request by using the internal processor serial-to-parallel conversion interface circuit, and sends the serialized memory data write request to the corresponding memory manager.

After performing a series of processing on the memory data write request (for specific processing, refer to the related content of the foregoing memory manager), the memory manager sends the memory data write request to the memory.

The memory performs the write operation corresponding to the memory data write request. In this way, the first processor completes the write operation on the data in the memory connected to the second processor.

An embodiment of this disclosure further provides a processor. The processor is integrated with the memory manager according to any one of the foregoing implementations.

An embodiment of this disclosure further provides an electronic device. The processor memory subsystem according to any one of the foregoing implementations is mounted in the electronic device.

The foregoing descriptions are merely embodiments of this disclosure, but are not intended to limit this disclosure. Any modification, equivalent replacement, or improvement made without departing from the spirit and principle of this disclosure should fall within the protection scope of this disclosure.

What is claimed is:

1. A memory manager configured to control data exchange between a processor and a memory, and comprising:
    a parallel interface circuit comprising:
        an internal connection end; and
        an external connection end configured to couple to the memory;
    a cache prefetching circuit;
    a memory control circuit coupled to the cache prefetching circuit, configured to control an on state and an off state of the cache prefetching circuit, and comprising:
        a first end; and
        a second end coupled to the internal connection end; and
    a serial-to-parallel conversion interface circuit comprising:
        a serial end configured to couple to the processor; and
        a parallel end coupled to the first end and the internal connection end, wherein the serial-to-parallel conversion interface circuit is configured to:
            receive, from the processor, a serialized memory data write request;
            convert the serialized memory data write request into a parallelized memory data write request; and
            send, to the memory control circuit, the parallelized memory data write request, wherein the cache prefetching circuit is coupled to the parallel end of the serial-to-parallel conversion interface circuit and the internal connection end of the parallel interface circuit, and wherein the memory control circuit is further configured to:
            selectively route data between the serial-to-parallel conversion interface circuit and the parallel interface circuit through the cache prefetching circuit in response to the cache prefetching circuit being in the on state; and
            bypass the cache prefetching circuit such that the parallel interface circuit is directly coupled to the serial-to-parallel conversion interface circuit in response to the cache prefetching circuit being in the off state.

2. The memory manager of claim 1, wherein the cache prefetching circuit is configured to prefetch data from memory and store the data.

3. The memory manager of claim 2, wherein the serial-to-parallel conversion interface circuit is configured to:
    receive, from the processor, a serialized cache data read request;
    convert the serialized cache data read request into a parallelized cache data read request; and
    send, to the cache prefetching circuit, the parallelized cache data read request, wherein the cache prefetching circuit is configured to send, to the serial-to-parallel conversion interface circuit, parallelized first data corresponding to the parallelized cache data read request, and
wherein the serial-to-parallel conversion interface circuit is further configured to:
    convert the parallelized first data into serialized first data; and
    send, to the processor, the serialized first data.

4. The memory manager of claim 2, wherein the serial-to-parallel conversion interface circuit is configured to:
    receive, from the processor, a serialized memory data read request;
    convert the serialized memory data read request into a parallelized memory data read request; and
    send, to the memory control circuit, the parallelized memory data read request,
wherein the memory control circuit is configured to send, using the parallel interface circuit, the parallelized memory data read request to the memory,
wherein the cache prefetching circuit is configured to:
    receive, from the memory, parallelized second data corresponding to the parallelized memory data read request; and
    send, to the serial-to-parallel conversion interface circuit, the parallelized second data, and
wherein the serial-to-parallel conversion interface circuit is further configured to:
    convert the parallelized second data into serialized second data; and
    send, to the processor, the serialized second data.

5. The memory manager of claim 4, wherein the cache prefetching circuit is further configured to store the parallelized second data.

6. The memory manager of claim 1, wherein the memory control circuit is configured to send, using the parallel interface circuit, the parallelized memory data write request to the memory.

7. The memory manager of claim 6, wherein the cache prefetching circuit is further configured to:
    prefetch, from the memory, processed data obtained through a write operation corresponding to the parallelized memory data write request; and
    store the processed data.

8. A processor memory subsystem, comprising:
    a first processor comprising a first serial-to-parallel conversion interface circuit having a first serial end;
    a first memory;
    a first memory manager comprising:
        a parallel interface circuit comprising:
            an internal connection end; and
            an external connection end configured to couple to the first memory;
        a cache prefetching circuit;
        a memory control circuit coupled to the cache prefetching circuit, configured to control an on state and an off state of the cache prefetching circuit and to control data exchange between the first processor and the first memory, and comprising:
            a first end; and
            a second end coupled to the internal connection end; and
        a second serial-to-parallel conversion interface circuit comprising:
            a second serial end configured to couple to the first serial end; and a parallel end coupled to the first end and the internal connection end, wherein the cache prefetching circuit is coupled to the parallel end of the serial-to-parallel conversion interface circuit and the internal connection end of the parallel interface circuit, and wherein the memory control circuit is further configured to:

selectively route data between the serial-to-parallel conversion interface circuit and the parallel interface circuit through the cache prefetching circuit in response to the cache prefetching circuit being in the on state; and bypass the cache prefetching circuit such that the parallel interface circuit is directly coupled to the serial-to-parallel conversion interface circuit in response to the cache prefetching circuit being in the off state;

a second processor is configured to send, using an input/output interface circuit, a parallelized memory data write request to a third processor, wherein the third processor comprises a third serial-to-parallel conversion interface circuit and is configured to:

convert, using the third serial-to-parallel conversion interface circuit, the parallelized memory data write request into a serialized memory data write request; and send, to a second memory manager and corresponding to the third processor, the serialized memory data write request.

9. The processor memory subsystem of claim 8, further comprising:

a plurality of memories;

a plurality of memory managers, wherein each of the memory managers is coupled to one of the memories; and two processors comprising a second processor and a third processor coupled to each other using an input/output interface circuit, wherein each of the two processors is coupled to one or more of the memory managers.

10. The processor memory subsystem of claim 9, wherein the second processor is configured to send, using the input/output interface circuit, a parallelized cache data read request to the third processor, and wherein the third processor comprises a third serial-to-parallel conversion interface circuit and is configured to:

convert, using the third serial-to-parallel conversion interface circuit, the parallelized cache data read request into a serialized cache data read request; and send, to a second memory manager in the memory managers and corresponding to the third processor, the serialized cache data read request.

11. The processor memory subsystem of claim 9, wherein the second processor is configured to send, using the input/output interface circuit, a parallelized memory data read request to the third processor, and wherein the third processor comprises a third serial-to-parallel conversion interface circuit and is configured to:

convert, using the third serial-to-parallel conversion interface circuit, the parallelized memory data read request into a serialized memory data read request; and send, to a second memory manager in the memory managers and corresponding to the third processor, the serialized memory data read request.

12. The processor memory subsystem of claim 9, wherein the first processor is configured to:

receive, from the one or more of the memory managers, serialized data;

convert, using the first serial-to-parallel conversion interface circuit, the serialized data into parallelized data; and send, to the third processor using the input/output interface circuit, the parallelized data.

13. The processor memory subsystem of claim 9, wherein the first memory manager is integrated into the first processor.

14. The processor memory subsystem of claim 9, wherein the first memory manager is independent of each of the first processor and the first memory.

15. An electronic device comprising:

a processor memory subsystem comprising:

a processor comprising a first serial-to-parallel conversion interface circuit having a first serial end;

a memory; and a memory manager comprising:

a parallel interface circuit comprising:

an internal connection end; and an external connection end configured to couple to the memory;

a cache prefetching circuit;

a memory control circuit coupled to the cache prefetching circuit, configured to control an on state and an off state of the cache prefetching circuit and to control data exchange between the processor and the memory, wherein the memory control circuit comprises:

a first end; and a second end coupled to the internal connection end; and a serial-to-parallel conversion interface circuit comprising:

a second serial end configured to couple to the first serial end; and a parallel end coupled to the first end and the internal connection end, wherein the serial-to-parallel conversion interface circuit is configured to:

receive, from the processor, a serialized memory data write request;

convert the serialized memory data write request into a parallelized memory data write request; and send, to the memory control circuit, the parallelized memory data write request, wherein the cache prefetching circuit is coupled to the parallel end of the serial-to-parallel conversion interface circuit and the internal connection end of the parallel interface circuit, and wherein the memory control circuit is further configured to:

selectively route data between the serial-to-parallel conversion interface circuit and the parallel interface circuit through the cache prefetching circuit in response to the cache prefetching circuit being in the on state; and bypass the cache prefetching circuit such that the parallel interface circuit is directly coupled to the serial-to-parallel conversion interface circuit in response to the cache prefetching circuit being in the off state.

16. The electronic device of claim 15, wherein the processor memory subsystem further comprises:

a plurality of memories;

a plurality of memory managers, wherein each of the memory managers is coupled to one of the memories; and two processors coupled to each other using an input/output interface circuit, wherein each of the two processors is coupled to one or more of the memory managers.

17. The electronic device of claim 15, wherein the memory manager is integrated into the processor.

18. The electronic device of claim 15, wherein the memory manager is independent of each of the processor and the memory.

19. The electronic device of claim 15, wherein the cache prefetching circuit is configured to prefetch data from the memory and store the data.

20. The electronic device of claim 15, wherein the memory control circuit is configured to send, using the parallel interface circuit, the parallelized memory data write request to the memory.

\* \* \* \* \*